(12) United States Patent
Gilfix et al.

(10) Patent No.: US 6,977,579 B2
(45) Date of Patent: Dec. 20, 2005

(54) RADIO FREQUENCY IDENTIFICATION AIDING THE VISUALLY IMPAIRED

(75) Inventors: Michael Gilfix, Austin, TX (US); Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 10/703,756

(22) Filed: Nov. 6, 2003

(65) Prior Publication Data

US 2005/0099306 A1 May 12, 2005

(51) Int. Cl.[7] .............................................. H04B 3/36
(52) U.S. Cl. ............................ 340/407.1; 340/539.11; 701/200
(58) Field of Search ..................... 340/407.1, 825.19, 340/825.49, 539.11, 539.13, 573.1, 328; 342/24, 118, 147; 367/118; 701/200

(56) References Cited

U.S. PATENT DOCUMENTS

| | | | |
|---|---|---|---|
| 5,032,836 A | | 7/1991 | Ono et al. |
| 5,047,774 A | | 9/1991 | Kimber et al. |
| 5,083,113 A | | 1/1992 | Slawinski et al. |
| 5,936,528 A | * | 8/1999 | Kobayashi et al. ..... 340/825.19 |
| 5,939,981 A | * | 8/1999 | Renney ................... 340/407.1 |
| 6,097,305 A | * | 8/2000 | Im et al. ................ 340/825.19 |
| 6,121,916 A | | 9/2000 | McDade |
| 6,191,724 B1 | | 2/2001 | McEwan |
| 6,497,367 B2 | * | 12/2002 | Conzola et al. ......... 235/462.45 |
| 6,574,549 B2 | * | 6/2003 | Cato et al. ............. 340/825.49 |
| 2002/0121986 A1 | * | 9/2002 | Krukowski et al. ..... 340/825.19 |
| 2003/0069977 A1 | * | 4/2003 | Heiden ....................... 709/227 |
| 2005/0060088 A1 | * | 3/2005 | Helai et al. ................. 701/208 |

FOREIGN PATENT DOCUMENTS

FR 2765969 1/1999

OTHER PUBLICATIONS

"Navigation System for the Visually Impaired", IBM Tech. Discl. Bulletin vol. 38, No. 10, pp. 103-104, Oct. 1995.*
Extending the Reach and Accuracy of TCP/IP Search Discovery; Research Disclosure; May 2001; p 836; US.
Ross et al; Development of a Wearable Computer Orientation System; 2002; vol. 6; pp 49-63; Springer-Verlag London Ltd; US.
Ross et al; Wearable Interfaces for Orientation and Wayfinding; Nov. 13-15, 2000; pp 193-200; Arlington, VA; US.
Friedlander et al; Bullseye? When Fitts' Law Doesn't Fit; CHI 98; Apr. 18-23, 1998; pp 257-264; Los Angeles, CA; US.
Nemirovsky et al; GuideShoes; Navigation Based on Musical Patterns; CHI 99; May 15-20, 1999; pp 266-267; US.

* cited by examiner

Primary Examiner—Thomas Mullen
(74) Attorney, Agent, or Firm—H. Artoush Ohanian; Diana L. Gerhardt; Biggers & Ohanian, LLP

(57) ABSTRACT

Radio frequency identification aiding the visually impaired, including receiving in an electronic travel aid ("ETA") for the visually impaired, from a radio frequency identification ("RFID") tag associated with an object, information that describes the object and displaying a description of the object through an interface for a visually impaired person. Information that describes the object may include at least one of a predefined set of attributes that describe the object. Many embodiments include retrieving, in dependence upon a unique identification code, further information describing the object—either locally from an ETA or through a network from a remote store of information.

18 Claims, 4 Drawing Sheets

RADIO FREQUENCY IDENTIFICATION AIDING THE VISUALLY IMPAIRED

BACKGROUND OF THE INVENTION

1. Field of the Invention

The field of the invention is data processing, or, more specifically, methods, systems, and products for radio frequency identification aiding the visually impaired.

2. Description of Related Art

Traditional primary travel aids for the visually impaired include guide dogs and long canes. Secondary aids include such electronic travel aids ("ETAs") as laser canes and sonar-based devices such as the well-known Sonic Guide™ and Sonic Pathfinder™. All have limitations. One limitation of prior art travel aids is that they provide little or no information regarding a user's orientation with respect to the general environment. The advent of global positioning systems and cellular telephone networks offers some hope of delivering to blind users pedestrian information describing location and general environment with accuracy, but cost effective devices for general orientation with blind-friendly displays are not generally available.

Prior art devices also have limitations regarding orientation with respect to a local environment and with the detection of hazards not detected by the use of a primary mobility aid. Long cane users, for example, find it difficult to maintain a straight travel path without some additional information regarding the local environment. Long cane users with good hearing may manage straight line travel along the side of a road carrying traffic and in some cases when walking along a wall listening to the echo of their cane and their foot steps. Some blind cane users may rely on cane contact with the 'shore' line or side curb, a cane technique sometimes called 'touch and drag.' Guide dog users often are almost completely ignorant of the features which border their routes. A guide dog is very good at navigating a blind person through a local environment without contact with or knowledge of the surroundings.

In terms of detection of local obstacles, prior art travel aids for the visually impaired have limitations. The long cane will not detect hazards above waist height unless the hazards continues down to the ground. Sonic-based guides are not good at detecting objects that do not reflect sound well, and some of them are practically useless indoors. In addition, it is important to remember that all independent travel is goal directed. Blind persons must not only avoid things, they must also find things. Prior art devices are generally unable to indicate the nature of objects in the environment or the location of objects farther away than the length of a cane. For all these reasons, there is a definite need for improvements in the field of travel aids for the visually impaired.

SUMMARY OF THE INVENTION

Visually impaired persons encounter objects when traveling. Information describing an object is encoded and stored in an RFID tag 'associated' with the object. RFID tags are closely, physically associated with objects by being affixed to them, inserted within them, and so on. A visually impaired person carries a secondary travel aid, an ETA designed and implemented according to embodiments of the present invention. The ETA includes an RFID reader and a directional antenna. While traveling through an environment having objects having associated RFID tags, the user turns on the RFID reader in the ETA. The RFID reader reads descriptive information from the tags on or in the objects in the environment, converts the information to a form suitable for display, and displays the descriptive information in a form suitable for use by the visually impaired, that is, through an audible display or a tactile display.

For reasons of economy, embodiments may use inexpensive RFID tags that bear limited memory. Therefore, the descriptive information stored in the RFID tags may include a unique identification code, such as a serial number, by use of which the ETA may look up further descriptive information, indexed or sorted according to the unique identification code. The further descriptive information may be stored locally on the ETA or across a network in a remote data store such as an on-line database.

More particularly, methods, systems, and products are disclosed in this specification for radio frequency identification aiding the visually impaired that include receiving in an electronic travel aid ("ETA") for the visually impaired, from a radio frequency identification ("RFID") tag associated with an object, information that describes the object. Embodiments also typically include displaying a description of the object through an interface for a visually impaired person. In some embodiments, the information that describes the object comprises at least one of a predefined set of attributes that describe the object.

In some embodiments, the information that describes the object comprises a unique identification code and such embodiments include retrieving, in dependence upon the unique identification code, further information describing the object. In some embodiments, retrieving further information describing the object is carried out by retrieving the further information from a store of information in the ETA. In some embodiments, retrieving further information describing the object is carried out by retrieving the further information through a network from a remote store of information.

Some ETAs according to embodiments of the present invention include a directional antenna and such ETAs typically are capable of inferring an approximate direction to an object in dependence upon an orientation of the ETA when a description of the object is displayed. In ETAs that have a directional antenna often also are implemented with the ability to infer an approximate distance to an object in dependence upon a signal strength of an RFID signal from the RFID tag associated with the object.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for radio frequency identification aiding the visually impaired. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

RFID Aiding the Visually Impaired

Figure 1:
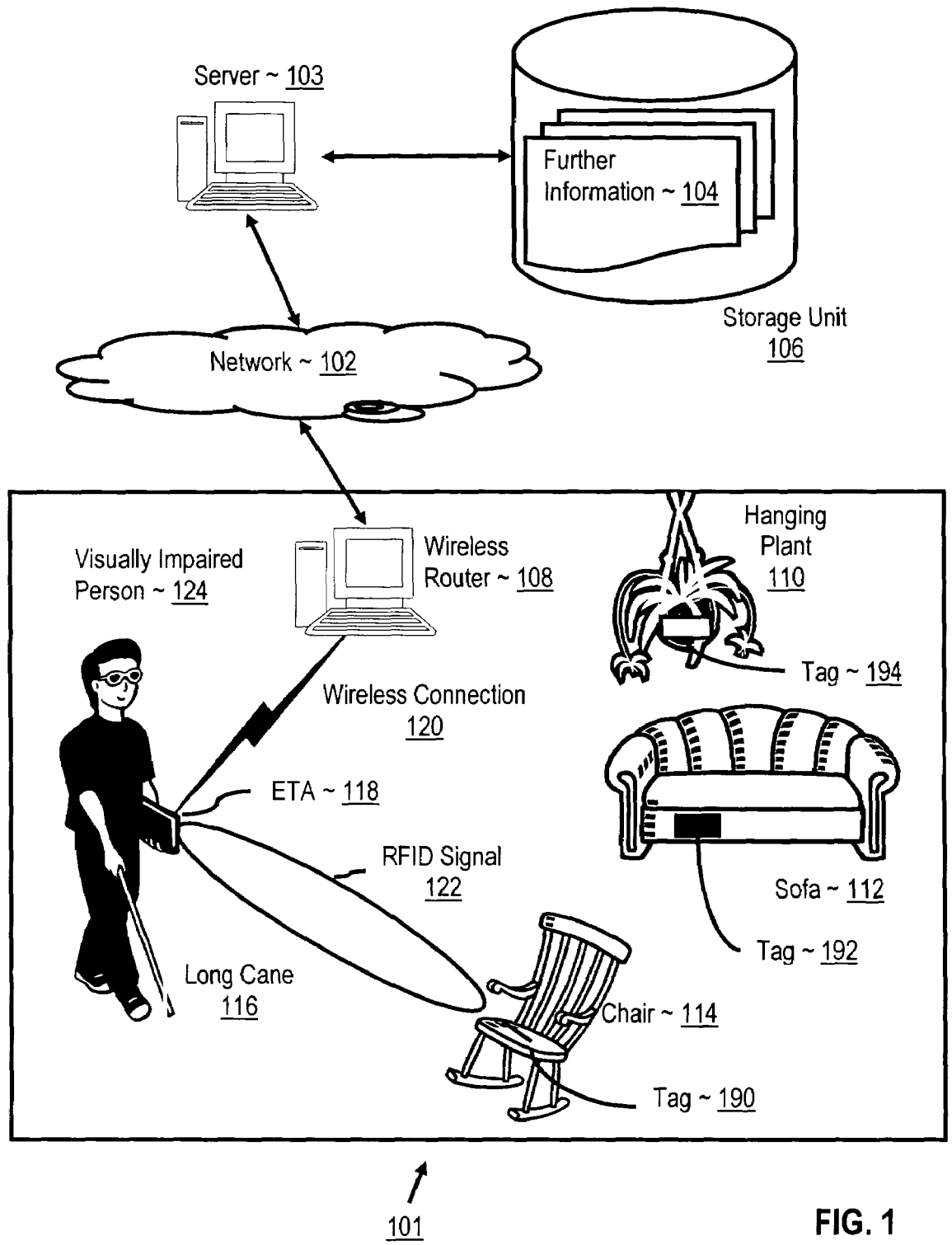
FIG. 1 illustrates a system for use of an ETA according to embodiments of the present invention.

Exemplary methods, systems, and products for radio frequency identification ("RFID") aiding the visually impaired are now explained with reference to the drawings, beginning with FIG. 1. FIG. 1 illustrates a system for use of an ETA according to embodiments of the present invention.

In the example of FIG. 1, a visually impaired person (124) uses a long cane (116) as a primary travel aid supplemented by an ETA (118) according to embodiments of the present invention as a secondary travel aid. In this example, the visually impaired person is in a local environment (101) that includes a chair (114), a sofa (112), and a hanging plant (110). Such a local environment may be represented by a room in a residence, a public coffee shop, a reception area in an office building, and many others as will occur to those of skill in the art.

The chair, sofa, and hanging plant each has an RFID device called a 'tag' associated with it. The chair (114) has an RFID tag (190) embedded in the seat of the chair. The sofa (112) has an RFID tag (192) embedded in the upholstery of the sofa. The hanging plant (110) has an RFID tag (194) attached to its container. ETA (118) contains an RFID reader that can receive from each RFID tag information that describes the object with which the tag is associated.

"RFID" means Radio Frequency Identification, a technology for identifying objects by use of an antenna, a transceiver, and a transponder or 'tag.' RFID transceivers are treated in this specification as including the electronic devices needed to convert the information in a radio signal into useful computer data; in this specification, therefore, RFID transceivers are referred to as "RFID readers." As the term 'transceiver' implies, however, RFID readers may read and write information to and from RFID transponders. RFID transponders are referred to in this specification as "RFID tags." RFID tags are programmed with RFID identification codes unique to each RFID tag.

An RFID antenna emits radio signals to activate an RFID tag and read and write data to and from the tag. Antennas act as data conduits between tags and transceivers or RFID readers. Antennas are available in a variety of shapes and sizes. ETA (118) includes a directional antenna packaged with it, built into its case, for portable, handheld use. An RFID reader in ETA (118) typically emits radio waves at power levels and at frequencies that are useful at ranges of anywhere from a few inches to 100 feet or more. When an RFID tag (114) passes through the electromagnetic field of a radio signal from an RFID antenna, the RFID tag detects the reader's activation signal. The reader decodes the data encoded in the tag's integrated circuit (silicon chip).

An RFID device that did not actively transmit to a reader was traditionally known as a 'tag.' An RFID device that actively transmitted to a reader was known as a transponder (TRANSmitter+resPONDER). It has become common in the industry, however, to interchange terminology and refer these devices as either tags or transponders more or less interchangeably. In this specification, for clarity of usage, the term 'tag' is used to refer generally to all RFID devices.

Tags are programmed with data that identifies the tag and therefore the item or object to which the tag is attached, inserted, embedded, or otherwise associated. Tags can be either read-only, volatile read/write, or write once/read many (WORM) and can be either active or passive. Active tags generally use batteries to power the tag's radio transmitter and receiver. Active tags generally contain more components than do passive tags, so active tags are usually larger in size and more expensive than passive tag. An active tag's memory size varies according to application requirements; some systems operate with up to 1 MB or more of memory. The useful life of an active tag is related to its battery life. Passive tags can be either battery or non-battery operated, according to their intended applications.

Passive tags reflect the RF signal transmitted to them from a reader and add information by modulating the reflected signal to convey identifying or descriptive information stored in computer memory in the tag. A passive tag having a battery usually does not use its battery to boost the energy of the reflected signal. A passive tag typically would use a battery to maintain memory in the tag or power the electronics that enable the tag to modulate the reflected signal. Passive RFID tags often operate without a battery or other power source, obtaining operating power generated from an RFID reader. Passive tags are typically much lighter than active tags, less expensive, and offer a very long operational lifetime. The trade off is that passive RFID tags have shorter read ranges than active tags and require a higher-powered reader.

RFID tags come in a wide variety of shapes and sizes. Animal tracking tags, inserted beneath an animal's skin, can be as small as a pencil lead in diameter and one-half inch in length. Some tags are screw-shaped to identify trees or wooden items, or credit-card shaped for use in access applications. The anti-theft hard plastic tags attached to merchandise in stores are RFID tags.

In the example of FIG. 1, RFID signal (122), transmitted from an RFID reader in ETA (118), activates RFID tag (190), a small form-factor, passive tag embedded in the seat of chair (114). Tag (190) is encoded with information that describes the chair. Such information may include a unique identification code as well as computer data encoded as text in ASCII, EBCDIC, Unicode, or otherwise as will occur to those of skill in the art. An example of descriptive text is the word "chair."

Another kind of descriptive text is more abstract: The word "sitable," for example, may describe an object upon which the user may sit, therefore including chairs, sofas, stools, love seats, ottomans, and so on. Similarly, terms like "sharp," "fragile," and others that will occur to those of skill in the art may describe an attribute of interest for visually impaired persons for many physical objects.

More and more manufacturers include RFID tags in manufactured items, for life cycle monitoring, anti-theft purposes, maintenance aids, and so on. As RFID tags become more common in items of manufacture, a new aid to the blind may be effected by including in all tags in all manufactured items one or more attributes from predefined sets of attributes that describe manufactured objects. Predefined sets of attributes may be predefined by standards organizations, so that the same sets of attributes are used by many or all manufacturers. In this way, an ETA according to embodiments of the present invention may be manufactured that will work with objects manufactured by any manufacturer.

In the example of FIG. 1, ETA (118) contains an RFID reader capable of receiving from tag (190) the information describing the chair (114), converting it into speech or Braille and displaying it to user (124). The display may be effected through a speaker or headphones driven by a text-to-speech converter or through a refreshable tactile Braille display.

In addition, or as an alternative, to storing descriptive text in the tag (190) itself, the information that describes the object, as read by the ETA, may include a unique identification code for the object (or the tag associated with the object). After reading the descriptive information from the tag, ETA (118) may then retrieve further information describing the object by use of the unique identification code. The usefulness of 'further information' is based upon the fact that memory for storage of descriptive information about an object may be limited as a cost control measure in the RFID tag associated with the object. Such RFID tags often may contain only a unique serial number for the tag and perhaps as little as one word or even just one byte of descriptive information, for example, "chair," "table," "knife," "sitable," "fragile," and others as will occur to those of skill in the art. On the other hand, it is advantageous for owners of objects in environments to be traveled by the visually impaired to be able to provide much more information describing objects, the exact nature of objects, their locations in the environment, and so on.

Retrieving further information describing the object may be carried out by retrieving the further information through network (102) from a remote store of further information (106). In the example of FIG. 1, ETA (118) includes a wireless communications adapter capable of effecting a data communications connection with wireless router (108). A useful aspect of mobile computing is the fast growing use of wireless routers or wireless access points, sometimes known as 'hot spots,' which allow portable computer users to function on the move. Hot spots are found now in coffee shops, hotels, lounges, book stores, restaurants, airports, and so on. Wireless router (108) represents such a hot spot, presenting the availability of convenient data communications to ETA (118) and its user (124).

Although the example of the data communications connection to retrieve further information is represented in FIG. 1 as a wireless connection, in fact, that is not a limitation of the present invention. Wired Internet connections, for example, are available in many public and private environments such as hotel rooms, offices, and so on, and ETA (118) is advantageously and optionally also implemented with a wired communications adapter, such as, for example, an Ethernet adapter, for use with wired data communications connections.

ETA (118) is programmed to carry out data communications to retrieve further information (104) from storage unit (106) by transmitting messages formulated according to a data communication protocol which may be, for example, HTTP (HyperText Transport Protocol), WAP (Wireless Access Protocol), HDTP (Handheld Device Transfer Protocol), or others as will occur to those of skill in the art. ETA (118) in this example communicates with storage unit (106) through server (103) which provides server-side functionality for database access in the form of Java servlets, CGI (Common Gateway Interface) scripts, or other server-side facilities for computer resource management as will occur to those of skill in the art.

Server-side functionality such as a Java servlet or a CGI script for retrieving particular items of further information (104) are identified by ETA (118) by use of URLs (Uniform Resource Locators) or URIs (Uniform Resource Identifiers), and the ETA transmits a data communications protocol message to a server-side function identified by such a URL or URI bearing at least one unique identification code encoded as 'form data.' In the example of FIG. 1, the server-side functionality supported by server (103) comprises an on-line service for use by ETAs and the visually impaired.

The on-line service is accessed at a cyberspace location, that is, a network address, identified by a URL or URI. That URL or URI is stored in RAM or non-volatile memory in ETA (118) as a setup parameter for ETA (118) and used by the ETA (118) in its data communications functions.

Although the example of retrieving further information is represented in FIG. 1 as a remote retrieval from a remote data store, it is useful to note that in addition, or as an alternative, retrieving further information describing an object may also be carried out by retrieving the further information from a store of information in the ETA itself. Such further information may be stored in the ETA in magnetic memory as, for example, a microdrive, in read-only memory ("ROM"), in electrically erasable programmable read only memory ("EEPROM" or 'flash memory'), and in other ways as will occur to those of skill in the art.

It will also occur to readers to ask how a manufacturer may know which objects need such further information stored for them. Which objects will a visually impaired user encounter in travel for which the user will need further information? In remote storage, in contrast with local storage in an ETA, further information may be stored for all objects. That is, manufacturers may provide web sites where a purchaser of an object bearing an embedded RFID tag may log on and record further information about the object. It is feasible for such web sites to implement storage for all manufactured objects bearing RFID tags. If an object's RFID tag bears only a serial number and a one-word text description, for example, such as "chair" or "sitable," its purchaser may log on to its manufacturer's web site and record in a database record identified by the tag's serial number the further information: "a rocking chair, presently located on the right side of the room, seven feet from the door."

In storage in an ETA, however, further information clearly cannot be stored for all objects. Storage in an ETA nevertheless is advantageous when a developer of an ETA can identify particular objects that may usefully be tagged as an aid to the visually impaired. Examples include an ETA developed as a travel aid through a museum, a concert hall, an airport or train terminal, for example. Other examples include any public place where secondary travel aids for the visually impaired are likely to be needed and particularly such public places where wireless hot spots are not available.

ETA (118) transmits RFID signal (122) through an antenna (not shown on FIG. 1). In an environment where several objects are present with RFID tags, an omni-directional antenna may activate more than one RFID tag at the same time, thereby presenting a risk of interference or confusion. ETA (118) therefore preferably includes a directional antenna. Implementing an ETA with a directional antenna also supports inferring an approximate direction to an object in dependence upon the orientation of the ETA when a description of the object is displayed. That is, from the user's point of view, the user (124) enters a local environment (101) and sweeps the environment directionally, from left to right, for example, with ETA (118). Because ETA (118) uses a directional antenna, the RFID tag (194) in the hanging plant, the RFID tag (192) in the sofa, and the RFID (190) tag in the rocking chair are each activated in turn as the ETA is pointed at them, thereby retrieving and displaying information describing each object as the ETA is pointed approximately at each object, thereby providing also an indication of the approximate direction from the ETA to each object.

The use of a directional antenna provides also the opportunity to infer and display information representing relative distance to an object. An RFID reader in ETA (118) is capable of transmitting and receiving over a limited range. The size of the range may vary from inches to many feet, but it does have some limit, a limit quickly learned by user. Perceiving a display of information about an object, therefore always signals to the user that the object is within the maximum range of the RFID reader in the ETA. In addition, ETA (118) infers an approximate distance to the object in dependence upon a signal strength of an RFID signal from the RFID tag associated with the object. ETA (118) contains electronics that recover and measure the relative radio signal strength of reflected signals from RFID tags. ETA (118) then converts the recovered and measured signal strength to an audible or tactile display for the user of relative distance from an object with which is associated an RFID tag. The ETA varies the audible tone or tactile display as signal strength changes, as the user brings the ETA closer to the object, or rather, closer to the RFID tag associated with the object, thereby presenting the user with a relative and approximate indication of the distance from the ETA to the object as the user moves toward or away from the object.

Figure 2:
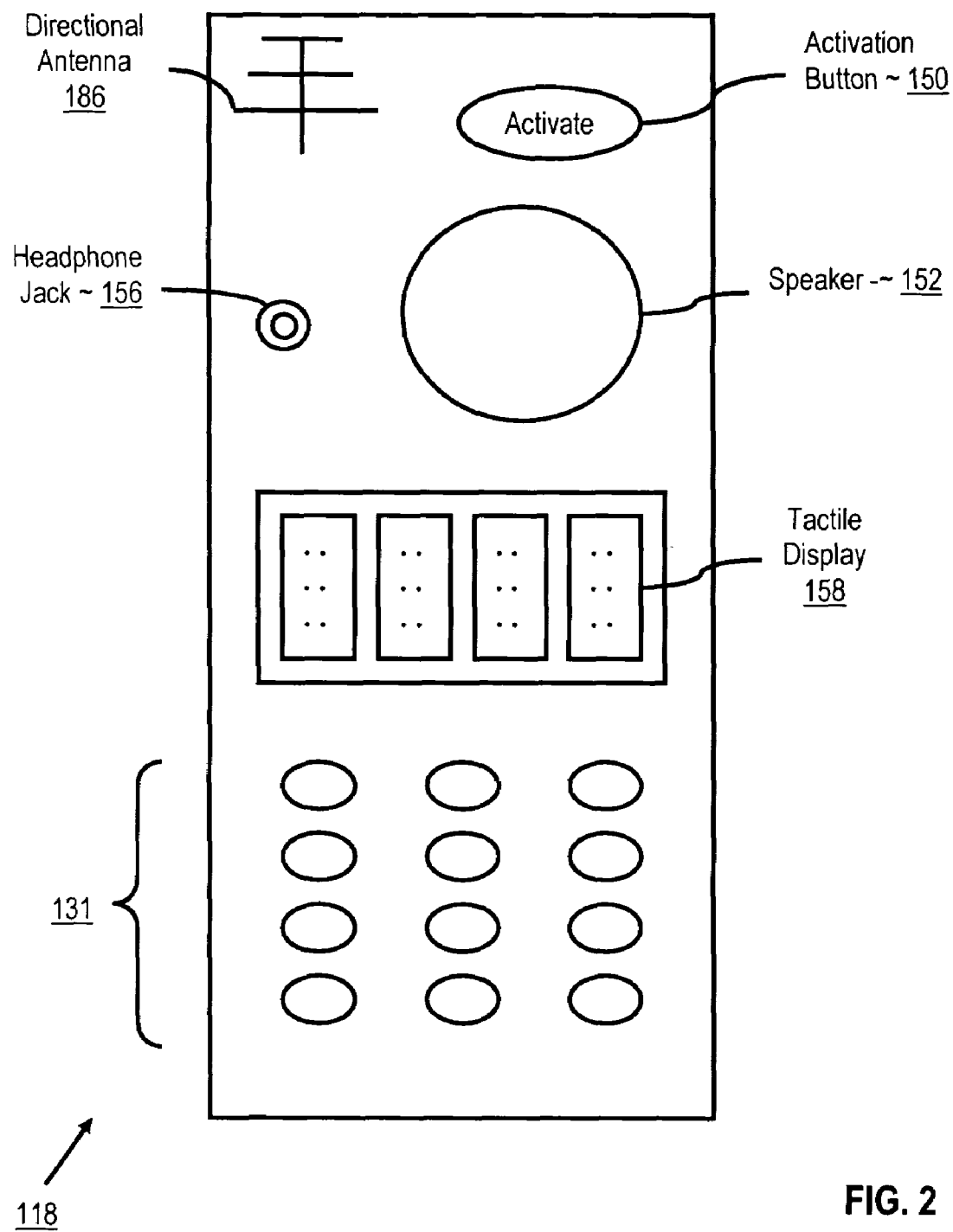
FIG. 2 sets forth a line drawing of an exemplary ETA (118) according to embodiments of the present invention.

FIG. 2 sets forth a line drawing of an exemplary ETA (118) according to embodiments of the present invention. Similar in form factor to a remote control for a television set or a VCR, ETA (118) includes an "Activate" button (150) to trigger its internal RFID reader. In many ETAs according to the present invention, Activate button (150) is configured to support a single press and release so as to trigger a single RFID activation or a series of single RFID operations—or to be held down or locked down for continuous RFID operation.

ETA (118) includes a directional antenna (186), which in FIG. 2 is shown in the line drawing of ETA (118), but which as a practical matter is typically mounted on a circuit board within ETA (118), mounted within or upon the case of ETA (118), or otherwise mounted as will occur to those of skill in the art. ETA (118) includes a headphone jack (156) and a speaker (152) to support audible display of information regarding objects associated with RFID tags. ETA (118) includes a tactile display (158), which may be implemented as a refreshable Braille display or a refreshable non-Braille tactile display.

ETA (118) also includes a keypad (131) to support user entry of information or queries. ETA (118) may be programmed, for example, to support user entry of queries regarding objects in an environment. A user looking for a place to sit down in an airport lounge may enter "sitable," for example. Then when the activate button is pressed, the ETA will ignore responses from RFID tags on non-sitable objects and display for the user only retrieved information describing sitable objects in the local environment, stools at food stands, seats in waiting areas, and so on.

Figure 3:
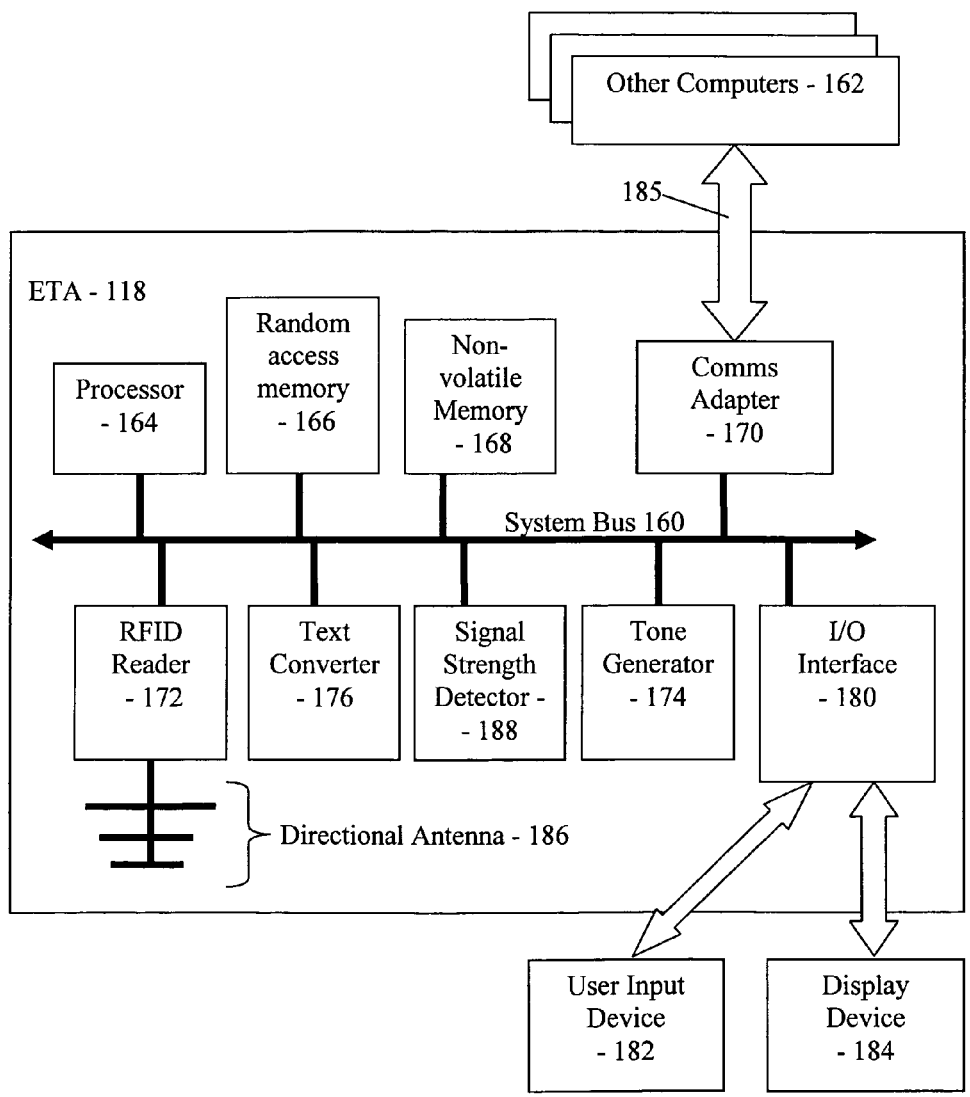
FIG. 3 is a block diagram of an exemplary ETA showing relations among components of included automated computing machinery.

ETAs according to embodiments of the present invention typically include, not only RFID readers, but also automated computing machinery designed to process the information retrieved from RFID tags through RFID readers and the further information retrieved from storage in computer memory either in the ETA itself or remotely from across a network. FIG. 3 is a block diagram of an exemplary ETA showing relations among components of included automated computing machinery. In FIG. 3, ETA (118) includes a processor (164), also typically referred to as a central processing unit or 'CPU.' The processor may be a microprocessor, a programmable control unit, or any other form of processor useful according to the form factor of a particular ETA as will occur to those of skill in the art. Other components of ETA (118) are coupled for data transfer to processor (164) through system bus (160).

ETA (118) includes random access memory or 'RAM' (166). Stored in RAM (166) is an application program. Application programs implementing inventive methods of the present invention are typically stored in RAM (166). In addition, software programs and further information describing objects with which RFID tags are associated may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

ETA (118) includes communications adapter (170) implementing data communications connections (185) to other computers (162), which may be servers, routers, or networks. Communications adapters implement the hardware level of data communications connections through which ETAs, servers, and routers send data communications directly to one another and through networks. Examples of communications adapters include modems for wired dial-up connections, Ethernet (IEEE 802.3) adapters for wired LAN connections, 802.11b adapters for wireless LAN connections, and Bluetooth adapters for wireless microLAN connections.

The example ETA of FIG. 3 includes one or more input/output interface adapters (180). Input/output interface adapters in computers implement user-oriented input/output through, for example, software drivers and computer hardware for controlling output to display devices (184) such as audio displays and tactile displays, as well as user input from user input devices (182) such as 'Activate' buttons and keypads.

ETA (118) includes an RFID reader (172) coupled to directional antenna (186). ETA (118) also includes text converter (176), which is coupled to RFID reader (172) through system bus (160). In ETA (118), information describing an object, as stored in RAM (166) or non-volatile memory (168), is typically encoded as text in ASCII, EBCDIC, Unicode, or another text encoding as will occur to those of skill in the art. Text converter (176) converts information describing an object from text to an encoding useful for display through a display device (184). That is, text converter (176) converts information describing an object from text to speech for display through an audio display or from text to a coding useful for display through a tactile display, such as, for example, a refreshable Braille display.

Signal strength detector (188) provides a signal whose magnitude represents the signal strength of a reflected radio signal received from an RFID tag through RFID reader (172). The signal from signal strength detector (188) is used to drive tone generator (174) to present to a user through a display device a display that varies with the signal strength of the reflected signal. In driving an audio display, for example, tone generator (174) may present a tone that varies in pitch or loudness in dependence upon the amplitude of the signal from signal strength detector (188).

Figure 4:
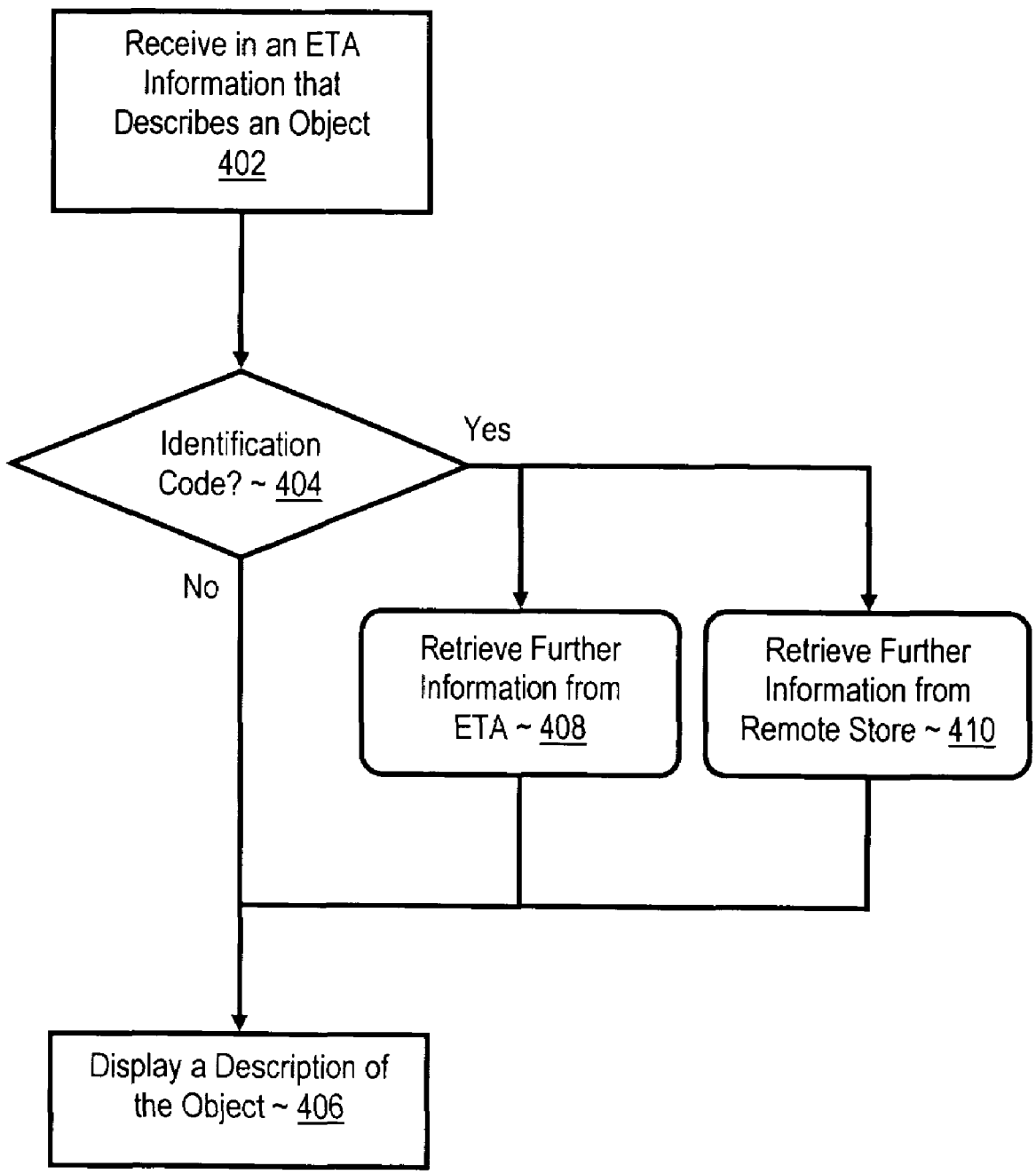
FIG. 4 sets forth a flow chart illustrating a method for radio frequency identification aiding the visually impaired.

By way of further explanation, FIG. 4 sets forth a flow chart illustrating a method for radio frequency identification aiding the visually impaired that includes receiving (402) in an ETA from an RFID tag associated with an object, information that describes the object. The method of FIG. 4 also includes displaying (406) a description of the object through an interface for a visually impaired person. Displays for visually impaired persons include audio displays and tactile displays. As mentioned above, information that describes the object may include one or more of a predefined set of attributes that describe the object.

Information that describes the object may include a unique identification code, such as, for example, a serial number of the RFID tag with which the object is associated. The method of FIG. 4 includes determining whether information describing the object includes a unique identification code (404), and, if it does, retrieving, in dependence upon the unique identification code, further information describing the object. Retrieving further information describing the object may include retrieving the further information through a network from a remote store of information (410). Alternatively, retrieving further information describing the object may include retrieving the further information from a store of information in the ETA (408).

Readers can now appreciate that the use by visually impaired persons of ETAs according to embodiments of the present invention has substantial advantages. ETAs according to the present invention can offer a user a large amount of information regarding the user's general orientation to a travel environment. In addition, the information provided can be voluminous and precise. Moreover, ETAs according to the present invention have the capability of describing generally and in detail hazards and other objects that would not be detected at all by long canes and would never be known to the user of a guide dog.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for radio frequency identification aiding the visually impaired, the method comprising:
   receiving in an electronic travel aid ("ETA") for the visually impaired, from a radio frequency identification ("RFID") tag associated with an object, information that describes the object, the information comprising a unique identification code;
   retrieving, in dependence upon the unique identification code, further information describing the object; and
   displaying a description of the object through an interface for a visually impaired person.

2. The method of claim 1 wherein the information that describes the object comprises at least one of a predefined set of attributes that describe the object.

3. The method of claim 1 wherein retrieving further information describing the object comprises retrieving the further information from a store of information in the ETA.

4. The method of claim 1 wherein retrieving further information describing the object comprises retrieving the further information through a network from a remote store of information.

5. The method of claim 1 wherein the ETA comprises a directional antenna and the method further comprises inferring an approximate direction to the object in dependence upon an orientation of the ETA when the description of the object is displayed.

6. The method of claim 1 wherein the ETA comprises a directional antenna and the method further comprises inferring an approximate distance to the object in dependence upon a signal strength of an RFID signal from the RFID tag associated with the object.

7. A system for radio frequency identification aiding the visually impaired, the system comprising:
   means for receiving in an electronic travel aid ("ETA") for the visually impaired, from a radio frequency identification ("RFID") tag associated with an object, information that describes the object, the information comprising a unique identification code;
   means for retrieving, in dependence upon the unique identification code, further information describing the object; and
   means for displaying a description of the object through an interface for a visually impaired person.

8. The system of claim 7 wherein the information that describes the object comprises at least one of a predefined set of attributes that describe the object.

9. The system of claim 7 wherein means for retrieving further information describing the object comprises means for retrieving the further information from a store of information in the ETA.

10. The system of claim 7 wherein means for retrieving further information describing the object comprises means for retrieving the further information through a network from a remote store of information.

11. The system of claim 7 wherein the ETA comprises a directional antenna and the system further comprises means for inferring an approximate direction to the object in dependence upon an orientation of the ETA when the description of the object is displayed.

12. The system of claim 7 wherein the ETA comprises a directional antenna and the system further comprises means for inferring an approximate distance to the object in dependence upon a signal strength of an RFID signal from the RFID tag associated with the object.

13. A computer program product for radio frequency identification aiding the visually impaired, the computer program product comprising:
   a recording medium;
   means, recorded on the recording medium, for receiving in an electronic travel aid ("ETA") for the visually impaired, from a radio frequency identification ("RFID") tag associated with an object, information that describes the object, the information comprising a unique identification code;
   means, recorded on the recording medium, for retrieving, in dependence upon the unique identification code, further information describing the object; and
   means, recorded on the recording medium, for displaying a description of the object through an interface for a visually impaired person.

14. The computer program product of claim 13 wherein the information that describes the object comprises at least one of a predefined set of attributes that describe the object.

15. The computer program product of claim 13 wherein means for retrieving further information describing the object comprises means, recorded on the recording medium, for retrieving the further information from a store of information in the ETA.

16. The computer program product of claim 13 wherein means for retrieving further information describing the object comprises means, recorded on the recording medium, for retrieving the further information through a network from a remote store of information.

17. The computer program product of claim 13 wherein the ETA comprises a directional antenna and the computer program product further comprises means, recorded on the recording medium, for inferring an approximate direction to the object in dependence upon an orientation of the ETA when the description of the object is displayed.

18. The computer program product of claim 13 wherein the ETA comprises a directional antenna and the computer program product further comprises means, recorded on the recording medium, for inferring an approximate distance to the object in dependence upon a signal strength of an RFID signal from the RFID tag associated with the object.

* * * * *